US011008410B2

United States Patent
Tartarin et al.

(10) Patent No.: US 11,008,410 B2
(45) Date of Patent: May 18, 2021

(54) COMPOSITION OF ORGANIC PEROXIDE WITHOUT A COLLOID AGENT

(71) Applicant: ARKEMA FRANCE, Colombes (FR)

(72) Inventors: Isabelle Tartarin, Oullins (FR); Stephanie Neubauer, Augsburg (DE); Nicolas Lagrain, Champier (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 14/429,661

(22) PCT Filed: Sep. 17, 2013

(86) PCT No.: PCT/FR2013/052129
§ 371 (c)(1),
(2) Date: Mar. 19, 2015

(87) PCT Pub. No.: WO2014/044961
PCT Pub. Date: Mar. 27, 2014

(65) Prior Publication Data
US 2015/0232590 A1    Aug. 20, 2015

(30) Foreign Application Priority Data
Sep. 21, 2012    (FR) ...................................... 1258875

(51) Int. Cl.
C08F 14/06    (2006.01)
C08F 4/34    (2006.01)
C08K 5/14    (2006.01)

(52) U.S. Cl.
CPC ............... *C08F 14/06* (2013.01); *C08F 4/34* (2013.01); *C08K 5/14* (2013.01); *C08G 2261/51* (2013.01); *C08G 2650/58* (2013.01)

(58) Field of Classification Search
CPC ...................................................... C08F 4/34
See application file for complete search history.

(56) References Cited

U.S. PATENT DOCUMENTS

| | | | |
|---|---|---|---|
| 3,988,261 A | 10/1976 | Barter et al. | |
| 4,391,876 A | 7/1983 | Tamosauskas et al. | |
| 4,499,250 A | 2/1985 | Lundin et al. | |
| 4,547,481 A | 10/1985 | Lundin et al. | |
| 5,260,390 A | 11/1993 | Torenbeek et al. | |
| 5,574,200 A * | 11/1996 | Lundin | C07C 407/00 502/160 |

FOREIGN PATENT DOCUMENTS

| | | |
|---|---|---|
| EP | 0 492 712 A1 | 7/1992 |
| FR | 2 474 509 A1 | 7/1981 |
| FR | 2 479 801 A1 | 10/1981 |
| WO | WO 99/05101 A1 | 2/1999 |
| WO | WO 00/42078 A1 | 7/2000 |
| WO | WO 03/095500 A1 | 11/2003 |

OTHER PUBLICATIONS

Freezing Points of Methanol-Water Solutions, retrieved from methanol.org on Jul. 20, 2016.*
Surfactants Europa, 3rd ed., G. L. Hollis, The Royal Society of Chemistry, 1993.*
BASF Kolliphor EL Technical Information document, Mar. 2012.*
BASF Solubilizer Compendium, Thomas Reintjes, Oct. 2011.*
Dow Tergitol L Series Surfactants product guide, May 2006.*
Dow Biodegradable, Low Foam Surfactants for Automatic Dishwashing Applications presentation, Ferrieux, S. et al., May 2013.*
International Search Report (PCT/ISA/210) dated Jan. 17, 2014, by the French Patent Office as the International Searching Authority for International Application No. PCT/FR2013/052129.
International Preliminary Examination Report (PCT/IPEA/401) by the French Patent Office as the International Searching Authority for International Application No. PCT/FR2013/052129.
Jean-Paul Canselier et al., "Procédés d'émulsification—Mécanisme de formation des emulsions (Emulsification processes—Mechanism of Formation of Emulsions)", Techniques de l'Ingénieur, pp. J2 152-1-J2 152-12 (pp. 1-12), publication of Jun. 10, 2004.

* cited by examiner

*Primary Examiner* — Richard A Huhn
(74) *Attorney, Agent, or Firm* — Buchanan Ingersoll & Rooney P.C.

(57) ABSTRACT

An aqueous emulsion composition of organic peroxide without a protective colloid agent wherein the emulsifying agent is a nonionic surfactant chosen exclusively from a block copolymer including at least one alkylene oxide block, a block copolymer including at least two alkylene oxide blocks, an alkoxylated fatty alcohol, an alkoxylated fatty acid, an alkoxylated vegetable or animal oil (hydrogenated or not) or a mixture of a plurality of these elements. Also, a method for producing this composition and specific uses thereof.

18 Claims, No Drawings

COMPOSITION OF ORGANIC PEROXIDE WITHOUT A COLLOID AGENT

FIELD OF THE INVENTION

A subject matter of the invention is an aqueous organic peroxide composition, liquid at storage temperature, which can be used in the polymerization or the copolymerization of ethylenically unsaturated monomers and in particular of vinyl chloride. The invention relates more particularly to an aqueous organic peroxide composition comprising a nonionic surfactant.

The precautions inherent in the instability of organic peroxides form an integral part of the knowledge well known to a person skilled in the art. Furthermore, it is for its unstable properties that organic peroxides are used, inter alia, as initiator of the polymerization of vinyl monomers.

The most reactive organic peroxides are commonly packaged in the form of an aqueous emulsion in the presence of antifreezes. This packaging makes it possible both to absorb and to dissipate the energy generated in the event of possible decompositions of the peroxides and to maintain the emulsion in a liquid form, at temperatures of less than $-10°$ C., generally of less than $-20°$ C. This packaging thus limits possible unintentional decomposition of the peroxides.

An emulsion comprises, in addition to water and antifreeze, an emulsifier which makes it possible to lower the interfacial tension between the aqueous phase and the peroxide in order to facilitate the dispersion thereof in the form of droplets and to stabilize these droplets over time (maintenance of the sizes).

Emulsions of organic peroxides are thus stabilized not only during their production but in particular during a relatively lengthy period corresponding to the transportation and storage before final use as polymerization initiator.

Although these precautions are generally sufficient to keep the handling of organic peroxides safe, they are generally insufficient to meet all the expectations of the users in terms of stability of the mean droplet size over time but also in terms of viscosity of the emulsion.

Over time, the emulsion destabilizes and the mean peroxide droplet size increases. The increase in the size of the droplets can result in a phase separation. According to the minimum technical criteria, a peroxide emulsion is regarded as satisfactory if the mean droplet size does not exceed 20 µm. A mean droplet size of less than 10 µm, more advantageously of less than 5 µm, is generally required, as well as a maximum size not exceeding 20 µm.

Use of a nonhomogeneous organic peroxide emulsion as polymerization initiator in a vinyl monomer emulsion or suspension can produce a nonhomogeneity in the final product. This nonhomogeneity is generally characterized by polymer particles poorly gelled during implementation in the molten state (fish eyes). In point of fact, the presence of fish eyes opacifies the polymer material. These stability considerations are thus very important for the applications where the transparency of the final product is imperative, in particular for medical applications.

Thus, the droplets of peroxide (by agglomeration of the peroxide or peroxides present in the emulsion, in particular after a certain period of time) of an organic peroxide emulsion have to have a low mean size, have a narrow distribution and be stable over time.

The stages of discharging the emulsion into intermediate storage silos, of pumping and of introduction of a peroxide emulsion into a polymerization reactor are important stages for the quality of the polymer obtained and the reliability of the polymerization process. These handling stages have to be carried out as rapidly as possible. In order to do this, it is crucial for the peroxide emulsion to exhibit a low viscosity, so that the flow of the emulsion is rendered as easy as possible. At a given temperature, the viscosity of this type of emulsion varies in particular as a function of the shear rate. It decreases when the shear rate increases and stabilizes for rate values generally of greater than $100$ $s^{-1}$. Thus, an organic peroxide emulsion must have a maximum dynamic viscosity of 1000 mPa·s (milliPascal·second) at low temperature, typically of the order of $-10°$ C., for a shear rate of $100$ $s^{-1}$ (the dynamic viscosity measurements are carried out using coaxial cylinders which create the shearing, for example according to the standard DIN 53019).

In point of fact, a person skilled in the art knows that, for this type of emulsion, to attempt to reduce the size of the droplets contributes to increasing the viscosity (see section 1.4 of the article by J P Canselier and M. Poux, "Procédés d'émulsification—Mécanisme de formation des émulsions [Emulsification processes—Mechanism of Formation of Emulsions]", Techniques de l'Ingénieur, J2 152, pp 1-12, publication of Jun. 10, 2004).

Thus, to achieve these two main objectives simultaneously is a major difficulty for a person skilled in the art due to the conflicting choices which he is obliged to envisage.

STATE OF THE ART

The document WO 99/05101 discloses the use of partially hydrolyzed polyvinyl acetate (PVA) as protective colloid in combination with nonionic surfactants having an HLB (hydrophilic-lipophilic balance) value of greater than 16, for aqueous peroxyester emulsions. A peroxide emulsion necessitates a low viscosity. Thus, this document specifies that a surfactant with an HLB of less than 16 can increase the final viscosity of the emulsion.

In the same way, the document WO 03/095500 discloses the use of partially hydrolyzed PVA in combination with nonionic surfactants having an HLB (hydrophilic-lipophilic balance) value of greater than 15, for aqueous peroxydicarbonate or diacyl peroxide emulsions. This document also specifies that the addition of surfactants with an HLB of less than 10 has a harmful effect and increases the final viscosity of the organic peroxide emulsion.

The document U.S. Pat. No. 3,988,261 lists a broad range of surfactants, both anionic or cationic and nonionic, but does not disclose the use of polyvinyl acetate as protective colloid for the stabilization of organic peroxide emulsion.

There currently does not exist any document of the state of the art which discloses exclusively the use of nonionic emulsifiers other than partially hydrolyzed polyvinyl acetate or cellulose derivatives for the stabilization of organic peroxide emulsion. Thus, the choice of the surfactant is essential for the final properties of the emulsion, and was obtained until now by the use of a protective colloid agent (partially hydrolyzed polyvinyl acetate or cellulose derivatives) used alone or in combination with nonionic surfactants other than partially hydrolyzed polyvinyl acetate (PVA).

A PVA is packaged in the fine powder form. In an industrial process, the products are advantageously introduced in the liquid form. A dissolution stage for the preparation of an aqueous PVA solution is thus necessary. This preparation stage represents an additional stage. The dissolution of PVA is difficult and requires a relatively lengthy preparation time, which thus exhibits a major additional cost. The dissolution of PVA in water can also form gels.

These undissolved gels have to be removed by the presence of one or more filters before the introduction into a peroxide composition. The dissolution capability of these surfactants depends on their degrees of hydrolysis. More particularly, at an equal concentration, it is more difficult to homogenize an aqueous solution of a PVA having a high degree of hydrolysis and to introduce this solution into a reactor than a solution comprising a PVA having a lower degree of hydrolysis.

Furthermore, the handling of powder on the industrial scale can represent, for an operator, additional precautions in terms of health and safety with regard to the risks of these powders (presence of fine particles, risks related to dust, and the like).

Ideally, a surfactant, such as PVA, should be, at ambient temperature, in the liquid form or in the paste form, in order to facilitate the dissolution thereof in an aqueous solution or the direct introduction thereof into an industrial process.

Thus, from the viewpoint of its many disadvantages, it is desirable to replace polyvinyl acetate (PVA) as emulsifying agent of an aqueous organic peroxide composition.

BRIEF DESCRIPTION OF THE INVENTION

The applicant company has discovered that the use of a nonionic emulsifier according to the invention devoid of protective colloid surprisingly stabilizes an aqueous organic peroxide emulsion and meets the conditions required regarding the droplet size, the viscosity and the flow time of the emulsion. The applicant company has also discovered that the addition of an emulsifier according to the invention makes it possible to obtain an organic peroxide emulsion which is less viscous than that commonly obtained with a PVA protective colloid or a mixture of this PVA protective colloid in combination with other nonionic emulsifiers.

The present invention thus relates to an aqueous organic peroxide emulsion composition devoid of protective colloid agent, consisting of:
from 10% to 65% by weight of one or more organic peroxides,
from 2% to 25% by weight of at least one antifreeze agent,
from 0.01% to 10% by weight of an emulsifying agent,
optionally at least one additive,
water, the amount of which is determined so as to form the remainder of the composition (up to 100%),
characterized in that the emulsifying agent consists of a nonionic surfactant chosen exclusively from:
a block copolymer comprising at least one alkylene oxide block; or
a block copolymer comprising at least two alkylene oxide blocks; or
an alkoxylated fatty alcohol; or
an alkoxylated fatty acid; or
an alkoxylated (hydrogenated or nonhydrogenated) vegetable or animal oil; or
a mixture of several of these components.

The invention exhibits the following advantages and thus makes it possible to obtain:
an emulsion exhibiting a low mean droplet size with a homogeneous and monomodal size distribution, without the appearance of gel;
an emulsion comprising a mean droplet size ($d_{50}$) of less than 10 μm after production or during storage at −20° C. for at least four months, the mean size being stabilized for at least four months. The maximum droplet size ($d_{100}$) does not exceed 20 μm;
an emulsion compatible with the polymerization of ethylenically unsaturated derivatives and in particular vinyl monomers, such as the vinyl chloride monomer, a liquid emulsion having a very low viscosity allowing a very short flow time;
an emulsion having a preparation time at the industrial level which is advantageously reduced, in particular by virtue of the absence of preparation of the solution in water of protective colloid of partially hydrolyzed PVA type;
an emulsion which minimizes the risks related to the handling of powders (health and safety of the operators).

Other characteristics of the invention are presented below:
preferably, the alkoxylated vegetable or animal oil is chosen from ethoxylated derivatives of mono-, di- or triglycerides and their mixtures;
advantageously, the alkoxylated vegetable or animal oil comprises a mixture of ethoxylated glycerol connected or not connected to one or more chains of fatty acids, the latter being or not being ethoxylated, fatty acids ethoxylated on the acid functional group and/or on the hydroxyl functional group carried by the fatty acid chain, and also variable proportions of fatty acids, of glycerol and of mono-, di- or triglycerides;
preferably, the fatty alcohol comprises an aromatic or nonaromatic, saturated or unsaturated, cyclic or noncyclic and linear or branched chain of 4 to 60 and preferably 4 to 20 carbon atoms and between 3 and 80 alkylene oxide units, preferably between 20 and 40;
preferably, the alkoxylated fatty acid comprises an aromatic or nonaromatic, saturated or unsaturated, cyclic or noncyclic and linear or branched chain of 4 to 60 and preferably 4 to 20 carbon atoms and between 3 and 80 alkylene oxide units, preferably between 20 and 40;
according to a possibility offered by the invention, the vegetable oil is ethoxylated or ethoxylated hydrogenated, such as, in particular, an ethoxylated castor oil or ethoxylated hydrogenated castor oil;
advantageously, the block copolymer comprises at least two alkylene oxide blocks, said alkylene oxide block comprising between 5 and 80 units; furthermore, the alkylene oxide units are preferably ethylene oxide units alone or ethylene oxide and propylene oxide and/or butylene oxide units;
advantageously, the nonionic surfactant is present at a concentration of between 0.05% and 5% by weight in the emulsion, preferably between 0.1% and 3% by weight;
preferably, the composition according to the invention comprises more than 30% by weight of one or more organic peroxides, preferably more than 45% by weight;
advantageously, the organic peroxide or peroxides are chosen from peroxyesters, peroxydicarbonates and/or diacyl peroxides.

It should be noted that some components, such as block copolymers, forming the subject matter of the present invention are sometimes provided, according to their molar masses, in the powder form. Preferably, in order to overcome the problems of health and safety of the operators mentioned above, these components will ideally be provided in the liquid form or in the paste form.

The present invention also relates to a process for the preparation of the composition according to the invention described above, characterized in that it comprises the stages, optionally successive, of:

dispersion of the antifreeze agent, optionally at least said additive and also the emulsifying agent in water in order to obtain a homogeneous aqueous phase, then the peroxide is added to the aqueous phase, and the mixture thus formed is emulsified during an emulsion stage at a temperature of less than 5° C.

Finally, the invention relates to the use of the composition described above in the polymerization or copolymerization of ethylenically unsaturated monomers. Preferably, the ethylenically unsaturated monomers comprise vinyl chloride.

The description which will follow is given solely by way of illustration and without implied limitation.

DETAILED DESCRIPTION OF THE INVENTION

The invention relates to organic peroxide emulsions concentrated in emulsion, said organic peroxide being present at a concentration of 10% to 65%, preferably of greater than 30% and more preferably of greater than 45%, by weight of the emulsion and is chosen from peroxyesters, peroxydicarbonates and diacyl peroxides.

Among the peroxyesters, the preferred peroxides are α-cumyl peroxyneodecanoate, α-cumyl peroxyneoheptanoate, 2,4,4-trimethylpent-2-yl peroxyneodecanoate, 3-hydroxy-1,1-dimethylbutyl peroxyneodecanoate, 3-hydroxy-1,1-dimethylbutyl peroxyneoheptanoate, tert-amyl peroxypivalate, tert-butyl peroxypivalate, tert-butyl peroxyneoheptanoate, 2,5-dimethyl-2,5-di(2-ethylhexanoylperoxy) hexane, tert-amyl peroxy-2-ethylhexanoate, tert-butyl peroxy-2-ethylhexanoate, 1,1,3,3-tetramethylbutyl peroxy-2-ethylhexanoate, 3-hydroxy-1,1-dimethylbutyl peroxy-2-ethylhexanoate, tert-butyl peroxyisobutyrate and their mixtures.

Among the peroxydicarbonates, the preferred peroxides are di(sec-butyl) peroxydicarbonate, dibutyl peroxydicarbonate, diisopropyl peroxydicarbonate, di(2-ethylhexyl) peroxydicarbonate, bis(3-methoxybutyl) peroxydicarbonate, bis(isobutyl) peroxydicarbonate, dineopentyl peroxydicarbonate, bis (1-methylheptyl) peroxydicarbonate, bis [2-(2-methoxyethoxy)ethyl]peroxydicarbonate, bis(3-methoxy-3-methylbutyl) peroxydicarbonate, bis(2-ethoxyethyl) peroxydicarbonate and their mixtures.

Among the diacyl peroxides, the preferred peroxides are diisobutyroyl peroxide, di(3,5,5-trimethylhexanoyl) peroxide, di(2-ethylhexanoyl) peroxide, di(2-ethylbutanoyl) peroxide, and also asymmetric peroxides, such as isobutyroyl octanoyl peroxide, isobutyroyl decanoyl peroxide, isobutyroyl lauroyl peroxide, 2-ethylbutanoyl decanoyl peroxide, 2-ethylhexanoyl lauroyl peroxide and their mixtures.

In order to be able to be stored at temperatures of less than −10° C., preferably of less than −20° C., the composition according to the invention comprises an antifreeze and more particularly a mixture of antifreezes.

As regards the antifreeze agent, mention may be made, for example, of monoalcohols, diols and triols, such as methanol, ethanol, ethylene glycol, isopropanol, n-propanol, propane-1,2-diol, propane-1,3-diol, glycerol, butan-1-ol, butan-2-ol, butane-1,3-diol and butane-1,4-diol and their mixtures, these mixtures comprising at least two of the antifreeze agents listed above, one of light alcohol type and the other of heavy alcohol type, advantageously a mixture of methanol and propane-1,2-diol.

The emulsifier according to the invention does not comprise a protective colloid and consists of a nonionic surfactant chosen from a block copolymer comprising at least one alkylene oxide block; or a block copolymer comprising at least two alkylene oxide blocks; or an alkoxylated fatty alcohol; or an alkoxylated fatty acid; or an alkoxylated (hydrogenated or nonhydrogenated) vegetable or animal oil; or a mixture of several of these components.

According to one embodiment, the emulsifier according to the invention can consist of a block copolymer comprising at least one alkylene oxide block (chosen from diblock or triblock copolymers) or a block copolymer comprising at least two alkylene oxide blocks (chosen from triblock copolymers). The block consisting of alkylene oxide polymer is chosen from ethylene oxide, propylene oxide or butylene oxide. A diblock copolymer according to the invention is a copolymer exhibiting an alkylene oxide block, more particularly an ethylene oxide block, and a block having hydrophobic properties commonly known to a person skilled in the art; for example a polyethylene or polypropylene block can be used. The triblock copolymer according to the invention comprising at least one alkylene oxide block is either chosen from a copolymer consisting of two alkylene oxide blocks surrounding a block of hydrophobic polymer commonly known to a person skilled in the art or is a block of alkylene oxide polymer surrounded by two blocks of hydrophobic polymer commonly known to a person skilled in the art. The alkylene oxide block is predominantly an ethylene oxide block. The triblock copolymer according to the invention comprising at least two alkylene oxide blocks is chosen with a first block consisting predominantly of ethylene oxide and to a minor extent of propylene oxide polymerized simultaneously or exclusively of polymerized ethylene oxide, and a second block consisting predominantly of propylene oxide and to a minor extent of butylene oxide polymerized simultaneously or exclusively of polymerized propylene oxide. The third block has the same structure as the first or second block described above but is covalently bonded only to the block having a different composition.

According to another embodiment, the emulsifier according to the invention can consist of an alkoxylated fatty alcohol, characterized in that it more particularly comprises ethylene oxide, propylene oxide or butylene oxide groups, and in particular a fatty alcohol comprising ethylene oxide chemical groups polymerized on the fatty alcohol and comprising or not comprising propylene oxide and/or butylene oxide groups polymerized on the fatty alcohol, the different oxide groups being distributed randomly or blockwise. Mention will in particular be made, among the fatty alcohols which can be used, of octyldodecanol, decanol, lauryl alcohol, oleocetyl alcohol, isodecanol, capric alcohol, the oxo alcohol isotridecanol, cetearyl alcohol, caprylic alcohol, myristyl alcohol, hexadecanol or palmityl alcohol, stearyl alcohol, eicosanyl or arachidyl alcohol, behenyl alcohol, oleyl alcohol, eicosenyl or gadolyl alcohol, docosenyl alcohol, ricinoleyl alcohol, linoleyl alcohol, linolenyl alcohol, and the like.

According to a preferred embodiment, the emulsifier according to the invention is an alkoxylated fatty acid or an alkoxylated (hydrogenated or nonhydrogenated) vegetable/animal oil. The alkoxylated fatty acids are characterized in that they more particularly comprise ethylene oxide, propylene oxide or butylene oxide groups. These fatty acids in particular comprise ethylene oxide chemical groups polymerized on the fatty acid and/or on a hydroxyl functional group present on the fatty chain of the acid and comprising or not comprising propylene oxide and/or butylene oxide groups polymerized on the fatty acid and/or on a hydroxyl functional group present on the fatty chain of the acid, the different oxide groups being distributed randomly or blockwise. The alkoxylated (hydrogenated or nonhydrogenated) vegetable/animal oils are in particular ethoxylated derivatives of mono-, di- and triglycerides and comprise a complex mixture of ethoxylated glycerol connected or not connected to one or more fatty acid chains (themselves ethoxylated or nonethoxylated), of fatty acids ethoxylated on the acid functional group and/or on the hydroxyl functional group carried by the fatty acid chain, and also variable proportions of fatty acids, of glycerol and of mono-, di- or triglycerides of fatty acids. The fatty acid has a single chemical structure or can be a mixture of chemical structures according to the nature of the oil used before ethoxylation or the mixture of oils used before the ethoxylation. The alkoxylation of the oil is carried out predominantly with ethylene oxide but polymerized blocks of propylene oxide and/or butylene oxide can also be inserted randomly or blockwise. The fatty acids bonded to the glycerol or fatty acids used in the alkoxylated fatty acids have chain lengths between 4 and 60 carbon atoms and preferably 4 to 20 and the number of moles of ethylene oxide is between 3 and 80 per mole of acid, more particularly of between 20 and 40. More specifically, particular interest is paid to ethoxylated vegetable oils, such as ethoxylated castor oil and ethoxylated hydrogenated castor oil of 20 to 40 mol of ethylene oxide per mole of ricinoleic acid. Mention may also be made of ethoxylated oils derived from copra, palm, palm kernel, olive, peanut, rapeseed, soybean, sunflower, walnut, hazelnut, coconut, poppy seed, safflower, linseed, perilla, oiticica and China wood oils.

Mention may also be made of ethoxylated fats based on tallow, crude or refined tall, whale, herring and sardine oils. All of these ethoxylated glyceride derivatives are characterized in that they comprise mixtures of ethoxylated mono-, di- or triglycerides and also ethoxylated derivatives of the corresponding fatty acids and glycerol. These fatty acids result in particular from saturated or unsaturated fatty acids caproic, caprylic, capric, lauric, myristic, palmitic, stearic, arachidic, behenic, myristoleic, palmitoleic, oleic, ricinoleic, erucic, linoleic, linolenic, oleostearic, licanic, gadoleic, erneic and resin acids.

Some unsaturated fatty acids are or are not hydrogenated, as in the case of ethoxylated castor oil where the ricinoleic group has or has not been partially or completely hydrogenated.

It is not departing from the scope of the invention to use a mixture of emulsifiers according to the invention.

The emulsion according to the invention can also comprise one or more additives intended to provide the final thermoplastic composition with specific properties/characteristics. These additives will ideally be present for the final polymerization or copolymerization.

These additives are under no circumstances a partially hydrolyzed polyvinyl acetate.

Thus, as regards the additive, it can be chosen from antioxidants; UV protecting agents; processing aids, having the role of improving the final appearance during the processing thereof, such as fatty amides, stearic acid and its salts, ethylenebisstearamide or fluoropolymers; antifogging agents; antiblocking agents, such as silica or talc; fillers, such as calcium carbonate, and nanofillers, such as, for example, clays; coupling agents, such as silanes; crosslinking agents, such as peroxides; antistatic agents; nucleating agents; pigments; dyes; plasticizers; viscosity reducers and flame-retardant additives, such as aluminum or magnesium hydroxides.

The aqueous liquid organic peroxide emulsion of the present invention can optionally comprise additives including pH-adjusting agents, such as phosphate and citrate buffers, chelating agents, biocides, for example fungicides, antiozonants, antioxidants, degradation inhibitors, blowing agents and mold-release agents.

The aqueous liquid organic peroxide emulsion of the present invention can also comprise additives generally used to stabilize the organic peroxide or to slow down its decomposition, such as phlegmatizers (isododecane, mineral oil, and the like) or hydroperoxides.

These additives can be added in amounts generally used and known to a person skilled in the art. These additives are generally used in contents of between 10 ppm and 10,000 ppm by weight, with respect to the weight of final polyethylene or ethylene copolymer or of final polyvinyl chloride. The plasticizers, viscosity reducers and flame-retardant additives can reach amounts much greater than 10,000 ppm.

The invention also relates to a process for the preparation of the emulsion described above, characterized in that the antifreeze agent, optionally one or more additives and also at least one emulsifier are dispersed in water, in order to obtain a homogeneous aqueous phase, and then the peroxide is added to said aqueous phase, everything being subsequently emulsified during an emulsion stage at a temperature of less than 5° C. (Celsius), so as to limit the premature decomposition of the peroxide, and preferably of less than −5° Celsius.

The stages mentioned above can be executed in the specific order prescribed or in a different order.

Apart from the specific successive stages of the process for the preparation of the composition according to the invention, the preparation of the emulsion does not differ in any way from the techniques and devices well known to a person skilled in the art. The temperature at which the emulsion is prepared is not critical but it must be sufficiently low to prevent a significant degree of decomposition, the result of which would be a fall in the assay. The temperature chosen depends on the organic peroxide. Furthermore, in order to prepare the aqueous emulsions, deionized water or distilled water is conventionally used.

The preparation process comprises an emulsion stage with a mixer having a high shear rate in order to divide and/or homogenize the peroxide in the aqueous phase as best as possible. Mention may be made, by way of example, of mechanically rotating paddle and anchor stirrers, propeller stirrers, that is to say one or more stirrers fitted to a common shaft, or turbine stirrers, that is to say those comprising baffles attached to the mixing vessel or in a position adjacent to the stirring members. Colloid mills and homogenizers can also be used. According to one implementational characteristic, the process according to the invention is characterized in that an ultrasonic mixer or a rotor/stator mixer is used.

Subsequent to the preparation of the emulsion, the stages of pumping and of introducing the emulsions into a polymerization reactor have to be carried out as rapidly as possible. For this reason, the peroxide emulsions should have a low viscosity.

Thus, the organic peroxide emulsions according to the invention exhibit a dynamic viscosity range at −10° C., 100 s$^{-1}$, of less than 1000 mPa·s, preferably of less than 700 mPa·s, immediately after production (the viscosity measurements are measured, for example, according to the standard DIN 53019, well known to a person skilled in the art, with a device of Viscotester Haake VT550 type, at −10° C. and for a shear rate of 100 s$^{-1}$).

Their flowability or flow time, measured by a flow cup technique, is less than 200 seconds, preferably less than 100 seconds (DIN 53211, diameter of the viscosity cup 4 mm, temperature of 5° C.).

The subsequent polymerization or copolymerization stages are not, in the context of the present invention, different from those of the prior art. The polymerization of the vinyl chloride monomer is carried out in suspension at an initiation temperature of between 45 and 70° C.

The invention also relates to the use of the emulsion defined above in the polymerization or copolymerization of ethylenically unsaturated monomers. A homopolymer is obtained by polymerization when just one ethylenically unsaturated monomer is polymerized. A copolymer is obtained by polymerization when at least two ethylenically unsaturated monomers are polymerized. It is understood that the monomers are capable of polymerizing with one another.

Mention may be made, as ethylenically unsaturated monomer, of acrylates, vinyl esters, vinyl halide monomer, vinyl ethers, vinylaromatic compounds, such as styrene, butadiene and preferably vinyl chloride.

The organic peroxide emulsion according to the present invention can be used in applications such as the polymerization of acrylic monomers, reactions for the modification of polymers, crosslinking reactions, bulk polymerization reactions and curing processes, as used in unsaturated polyester resins.

Production of the Formulations of the Compositions Tested:

The emulsions comprising a surfactant according to the invention and that comprising a comparative PVA are prepared according to the same procedure.

The aqueous phase comprising the surfactant, the antifreeze agent and the water is stirred at between 500 and 1000 rpm (revolutions per minute) and maintained at −5° C. (Celsius). The organic peroxide is gradually added to the reactor containing this water/surfactant/antifreeze mixture. Stirring is maintained at 2000 rpm for three minutes. The combined mixture is subsequently vigorously stirred using an "Ultra-Turrax type S-25N 18G" ultrasonic device at 9500 rpm for two minutes, followed by stirring using a paddle at 1000 rpm for one minute. Each emulsion is carried out on 200 grams in total.

Tests Carried Out:

The dynamic viscosity measurements are carried out using a viscometer of "Viscotester Haake VT550" type. The measurement device is the "SV-DIN 53019", referring to the standard DIN 53019. The measurement is carried out using coaxial cylinders which create the shearing. Between 5 and 10 ml (milliliters) of emulsion are introduced into the measurement chamber maintained at −10° C. The values given in the examples below correspond to a shear rate of 100 $s^{-1}$ and are expressed in mPa·s. The accuracy of the measurement is ±10% of the value shown.

The measurements of flow time are carried out using flow cups according to the standard DIN 53211 (diameter of the viscosity cup: 4 mm), which is well known to a person skilled in the art. The measuring is carried out on 100 g of emulsion after conditioning at +5° C. The measurements of flow time are expressed in seconds and the accuracy is ±10% of the value shown.

The droplet size ($d_{100}$ and $d_{50}$) is determined by conventional means using the light scattering technique. The term "$d_{100}$" corresponds to the diameter such that 100% of the volume of the sample of organic peroxide droplets in the aqueous emulsion has a diameter of less than $d_{100}$ and the term "$d_{50}$" corresponds to the average diameter such that 50% of the volume of the organic peroxide droplets in the aqueous emulsion has a diameter of less than $d_{50}$. The measurements are carried out using a Malvern Master Sizer 2000® device at ambient temperature. The droplet size $d_{50}$ or $d_{100}$ is given with an accuracy of ±0.5 μm (micrometer).

Starting Materials of the Compositions Tested:

Mainly two emulsions were prepared in order to carry out the tests which make it possible to characterize the compositions, according to the prior art and according to the invention.

The first emulsion consists of di(2-ethylhexyl) peroxydicarbonate at 60% by weight comprises:
- an antifreeze system which is a mixture of alcohols with a 20/80 ratio by weight of propylene glycol/methanol, with an overall concentration of 14%;
- a water/antifreeze ratio of 64/36 by weight;
- a content of di(2-ethylhexyl) peroxydicarbonate of 60% by weight. The di(2-ethylhexyl) peroxydicarbonate is Luperox® 223 from Arkema, with a purity of 97%;
- a content of surfactant of 1.2% by weight;
- the remainder is distilled water.

The second emulsion consists of tert-butyl peroxyneodecanoate at 50% by weight comprises:
- an antifreeze system which is a mixture of alcohols with a 40/60 ratio by weight of propylene glycol/methanol, with an overall concentration of 16%;
- a water/antifreeze ratio of 67/33 by weight;
- a content of tert-butyl peroxyneodecanoate of 50% by weight. The tert-butyl peroxyneodecanoate is Luperox® 10 from Arkema, with a purity of 97%;
- a content of surfactant of 1.2% by weight;
- the remainder is distilled water.

Characterizations of the Surfactants:

The characteristics of the emulsifying agent according to the invention and a comparative protective colloid of partially hydrolyzed polyvinyl acetate (PVA) type are presented in table 1 below.

The emulsifying agents 1a, 1b, 1c and 1d are characterized here by the determination of the hydrophilic-lipophilic balance (HLB), which makes it possible to assess the solubility of any surface-active agent, and by the ethylene oxide number. The HLB measurement (from 1 to 40) and its meaning (the higher the HLB, the more hydrophilic the emulsifier) are well known to a person skilled in the art. The PVA is characterized by its degree of polymerization and by its degree of hydrolysis.

TABLE 1

| 1a | | |
|---|---|---|
| | Moles of ethylene oxide/mole of acid ratio | HLB |
| Remcopal ® 20 (R20) | 20 | 9.5 |
| Remcopal ® R 4097 (R 4097) | 40 | 13 |
| Remcopal ® RH 4090 (RH 4090) | 40 | 12.9 |

| 1b | | |
|---|---|---|
| | Moles of ethylene oxide/mole of alcohol ratio | HLB |
| Ethoxylated oleyl alcohol | 20 | 15 |
| Ethoxylated lauryl alcohol | 20 | 16 |
| Ethoxylated 1-hexadecanol | 4 | 9 |

| 1c | | |
|---|---|---|
| | Moles of ethylene oxide/mole of fatty acid ratio | HLB |
| Tween ® 20 (polyoxyethylene sorbitan monolaurate) | 20 | 16.7 |
| Tween ® 85 (polyoxyethylene sorbitan trioleate) | 20 | 11 |

TABLE 1-continued

1d

|  | Mn (g/mol) | HLB |
|---|---|---|
| PE-PEG copolymer (from Aldrich) (PE-PEG) | 920 (10 ethylene oxide units) | 10 |
| PEG-PPG-PEG copolymer (Pluronic ® PE 10500 from BASF) (PE 10500) | 6500 (74 ethylene oxide units) | 10 |

1e

|  | Degree of hydrolysis | Degree of polymerization | HLB |
|---|---|---|---|
| Polyvinyl acetate having a degree of hydrolysis of 73 (PVA 73) | 72-73 | 800 | — |

Emulsions:

Emulsions 1 to 6 correspond to di(2-ethylhexyl) peroxydicarbonate peroxide emulsions and emulsions 7 and 8 correspond to tert-butyl peroxyneodecanoate peroxide emulsions, and are characterized in tables 2 and 3:

TABLE 2

|  | Emulsions 1-6 | Emulsions 7-8 |
|---|---|---|
| Di(2-ethylhexyl) peroxydicarbonate, % | 60.0 |  |
| tert-Butyl peroxyneodecanoate, % |  | 50.0 |
| Methanol, % | 11.2 | 9.6 |
| Propylene glycol, % | 2.8 | 6.4 |
| Surfactant, % | 1.2 | 1.2 |
| Water, % | 24.8 | 32.8 |

TABLE 3

|  | $d_{50}$ (μm) | $d_{100}$ (μm) | Viscosity (mPa · s) | Flow time (s) |
|---|---|---|---|---|
| Emulsion 1 (A 72.5) | 3.3 | 10.0 | 1100 | 145 |
| Emulsion 2 (R20) | 2.9 | 7.6 | 220 | 27 |
| Emulsion 3 (R4097) | 2.9 | 7.6 | 245 | 30 |
| Emulsion 4 (RH4090) | 3.6 | 10 | 265 | 31 |
| Emulsion 5 (ethoxylated oleyl alcohol) | 3.2 | 8.7 | 280 | 35 |
| Emulsion 5a (ethoxylated lauryl alcohol) | 2.2 | 5.0 | 260 | 32 |
| Emulsion 5b (ethoxylated 1-hexadecanol) | 3 | 7.6 | 258 | 36 |
| Emulsion 5c (polyoxyethylene sorbitan monolaurate) | 2.5 | 6.6 | 260 | 31 |
| Emulsion 5d (polyoxyethylene sorbitan trioleate) | 3.0 | 7.6 | 149 | 20 |
| Emulsion 6 (PE-PEG) | 4.1 | 13 | 365 | 42 |
| Emulsion 6a (PE 10500) | 2.9 | 7.6 | 341 | 39 |
| Emulsion 7 (A 72.5) | 3.3 | 8.7 | 620 | 70 |
| Emulsion 8 (R20) | 3.4 | 8.7 | 103 | 18 |

The emulsions according to the invention (emulsions 1-6 and 8) and the comparative emulsion (emulsion 7) all have organic peroxide mean droplet sizes corresponding to the strict characteristics demanded in the field under consideration. On the other hand, one of the main advantages of the present invention lies in a major lowering in the viscosity and in the flow time of the resultant peroxide emulsion. This is because the viscosity of the emulsions resulting from the stabilization of the surfactants of the present invention has been reduced by at least a factor of 3, indeed even a factor of 5, with respect to the comparative emulsion. This very significant improvement in the viscosity directly influences the flow time, involving a very great reduction in the flow time with respect to the comparative test.

Generally, a concentrated 50% by weight peroxyester emulsion is slightly more fluid than a concentrated 60% by weight peroxydicarbonate emulsion. In the same way as for the peroxydicarbonate emulsions, the peroxyester emulsions stabilized by the surfactants according to the invention are more fluid than that stabilized by partially hydrolyzed polyvinyl acetate. This is because the viscosity of the peroxyester emulsion comprising the surfactant Remcopal®20 has been reduced by a factor 6 with respect to that comprising a PVA (emulsion 7). These very good results make it possible to drastically reduce the time for pumping and introducing the peroxide emulsions into a reactor for the polymerization of vinyl monomer of vinyl chloride type.

It should be noted that the tests presented here do not include diacyl peroxides but the results obtained on peroxyesters and peroxycarbonates make it possible to envisage similar results with diacyl peroxides, since diacyl peroxides have formed the subject of preliminary tests as satisfactory as those obtained with the peroxyesters and peroxydicarbonates.

The emulsions produced with an emulsifying agent according to the invention (emulsion 2 below) and two comparative protective colloids of partially hydrolyzed polyvinyl acetate type (emulsions 1 and 2 below), at a degree of hydrolysis of the PVA of respectively 72-73% (PVA 73) and 42-45% (PVA 42-45), are stored at −20° C. for several months. The characteristics are measured after different storage times. The results are presented in table 4:

TABLE 4

|  | Emulsion 1 (PVA 73) | Emulsion 1' (PVA 42-45) | Emulsion 2 (R20) | Emulsion 3 (R4097) |
|---|---|---|---|---|
| $d_{50}$ (μm) |  |  |  |  |
| t 0 | 3.3 | 4.0 | 2.9 | 2.9 |
| t 1 month | 3.6 | 4.2 | 2.9 | 3.2 |
| t 2 months | 3.7 | 4.2 | 3.0 | 3.3 |
| t 3 months | 3.8 | 4.4 | 3.0 | / |
| t 4 months | 3.8 | 4.4 | 3.0 | 3.4 |
| $d_{max}$ (μm) |  |  |  |  |
| t 0 | 10.0 | 12.6 | 7.6 | 7.6 |
| t 1 month | 10.0 | 13.2 | 7.6 | 8.7 |
| t 2 months | 10.0 | 15.1 | 7.6 | 8.7 |
| t 3 months | 13.2 | 15.1 | 7.6 | / |
| t 4 months | 13.2 | 15.1 | 7.6 | 8.8 |
| Viscosity (mPa · s) |  |  |  |  |
| t 0 | 1100 | 570 | 220 | 245 |
| t 1 month | 1180 | 560 | 180 | 223 |
| t 2 months | 1170 | 630 | 190 | 229 |
| t 3 months | 1170 | 670 | / | / |
| t 4 months | 1140 | 680 | / | 232 |
| Flow time (s) |  |  |  |  |
| t 0 | 145 | 67 | 27 | 30 |
| t 1 month | 170 | 70 | 25 | 29 |
| t 2 months | 171 | 77 | 23 | 26 |
| t 3 months | 198 | 85 | 23 | / |
| t 4 months | 205 | 89 | 23 | 28 |

The emulsion comprising the emulsifying agent of ethoxylated castor oil type (emulsions 2 and 3) according to the invention and that comprising a protective colloid of partially hydrolyzed polyvinyl acetate type (emulsion 1) make it possible to retain a virtually constant mean droplet size and viscosity after a minimum of 4 months of storage.

Nevertheless, the results show a clear advantage for the composition according to the invention (emulsions 2 and 3) from the viewpoint of the criterion of the droplet size. This is because, whether from the viewpoint of the mean size ($d_{50}$) or the maximum size ($d_{100}$), the composition according to the invention displays results far superior to the composition comprising PVA: the peroxide mean droplet size ($d_{50}$) in the composition according to the invention is more than 25% lower than that of the composition with PVA, while the maximum droplet size ($d_{100}$) of the composition of the invention is lower by approximately 25% to close to 35% than that of the composition with PVA.

The viscosity of the emulsion according to the present invention remains very fluid and less than 300 mPa·s (measured according to the standard DIN 53019 with a Viscotester Haake VT550 at −10° C. and for a shear rate of 100 $s^{-1}$), the flow times remain less than 50 seconds and preferably less than 30 seconds and the maximum sizes $d_{100}$ do not exceed 20 μm (micrometers), preferably 10 μm (micrometers).

On the other hand, only the emulsion comprising a surfactant according to the invention makes it possible to retain a virtually constant flow time throughout the storage time of at least 4 months.

Generally, only the aqueous peroxide emulsion compositions according to the invention make it possible to solve in a particularly satisfactory fashion the two major technical problems, namely the enlarging of the peroxide droplets over time or in other words the stability of the emulsion, and the often excessively high viscosity of the emulsion under cold conditions, resulting in particular in unsatisfactory flow times.

The invention claimed is:

1. An aqueous organic peroxide emulsion composition devoid of protective colloid agent selected from a partially hydrolyzed polyvinyl acetate or cellulose derivatives, the emulsion consisting of:
    from 10% to 65% by weight of one or more organic peroxides,
    from 2% to 25% by weight of at least one antifreeze agent,
    from 0.01% to 10% by weight of an emulsifying agent,
    optionally at least one additive,
    water, the amount of which is determined so as to form the remainder of the composition (up to 100%),
    wherein the emulsifying agent consists of a nonionic surfactant chosen exclusively from:
    a block copolymer comprising three alkylene oxide blocks; or
    an alkoxylated fatty alcohol; or
    an alkoxylated fatty acid; or
    an alkoxylated (hydrogenated or nonhydrogenated) vegetable or animal oil; or
    a mixture of several of these components.

2. The composition as claimed in claim 1, wherein the nonionic surfactant is the alkoxylated vegetable or animal oil, wherein the alkoxylated vegetable or animal oil is chosen from ethoxylated derivatives of mono-, di- or triglycerides and their mixtures.

3. The composition as claimed in claim 1, wherein the nonionic surfactant is the alkoxylated vegetable or animal oil, wherein the alkoxylated vegetable or animal oil comprises a mixture of:
    ethoxylated glycerol connected or not connected to one or more chains of fatty acids, the latter being or not being ethoxylated,
    fatty acids ethoxylated on the acid functional group and/or on the hydroxyl functional group carried by the fatty acid chain, and also
    variable proportions of fatty acids, of glycerol and of mono-, di- or triglycerides.

4. The composition as claimed in claim 1, wherein the nonionic surfactant is the alkoxylated fatty alcohol, wherein the alkoxylated fatty alcohol comprises an aromatic or nonaromatic, saturated or unsaturated, cyclic or noncyclic and linear or branched chain of 4 to 20 carbon atoms and between 20 and 40 alkylene oxide units.

5. The composition as claimed in claim 1, wherein the nonionic surfactant is the alkoxylated vegetable oil, wherein the alkoxylated vegetable oil is ethoxylated or ethoxylated hydrogenated.

6. The composition as claimed in claim 1, wherein the nonionic surfactant is the alkoxylated fatty alcohol, wherein the alkoxylated fatty alcohol comprises an aromatic or nonaromatic, saturated or unsaturated, cyclic or noncyclic and linear or branched chain of 4 to 60 carbon atoms and between 3 and 80 alkylene oxide units.

7. The composition as claimed in claim 1, wherein the nonionic surfactant is the block copolymer, wherein the block copolymer comprises at least two alkylene oxide blocks, said alkylene oxide block comprising between 5 and 80 units.

8. The composition as claimed in claim 6, wherein the alkylene oxide units are ethylene oxide units alone or ethylene oxide and propylene oxide and/or butylene oxide units.

9. The composition as claimed in claim 1, wherein the nonionic surfactant is present at a concentration of between 0.05% and 5% by weight in the emulsion.

10. The composition as claimed in claim 1, wherein the composition comprises more than 30% by weight of one or more organic peroxides.

11. The composition as claimed in claim 1, wherein the organic peroxide or peroxides are chosen from peroxyesters, peroxydicarbonates and/or diacyl peroxides.

12. A process for the preparation of the composition as claimed in claim 1, wherein the process comprises the stages, optionally successive, of:
    dispersion of the antifreeze agent, optionally at least said additive and also the emulsifying agent in water in order to obtain a homogeneous aqueous phase, then
    the peroxide is added to the aqueous phase, and
    the mixture thus formed is emulsified during an emulsion stage at a temperature of less than 5° C.

13. A method of polymerization or the copolymerization of ethylenically unsaturated monomers, the method comprising adding the composition as claimed in claim 1 in the polymerization or the copolymerization of ethylenically unsaturated monomers.

14. The method as claimed in claim 13, wherein the ethylenically unsaturated monomers comprise vinyl chloride.

15. The composition as claimed in claim 1, wherein the nonionic surfactant is the alkoxylated vegetable oil, wherein the alkoxylated vegetable oil is an ethoxylated castor oil or ethoxylated hydrogenated castor oil.

16. The composition as claimed in claim 1, wherein the nonionic surfactant is present at a concentration of between 0.1% and 3% by weight in the emulsion.

17. The composition as claimed in claim 1, wherein the composition comprises more than 45% by weight of one or more organic peroxides.

18. An aqueous organic peroxide emulsion composition devoid of protective colloid agent, the emulsion consisting of:
   from 10% to 65% by weight of one or more organic peroxides,
   from 2% to 25% by weight of at least one antifreeze agent,
   from 0.01% to 10% by weight of an emulsifying agent,
   optionally at least one additive,
   water, the amount of which is determined so as to form the remainder of the composition (up to 100%),
   wherein the emulsifying agent consists of a nonionic surfactant chosen exclusively from:
   a block copolymer comprising three alkylene oxide blocks; or
   an alkoxylated fatty alcohol; or
   an alkoxylated fatty acid; or
   an alkoxylated (hydrogenated or nonhydrogenated) vegetable or animal oil; or
   a mixture of several of these components.

* * * * *